(12) United States Patent
Takeda et al.

(10) Patent No.: US 12,270,825 B2
(45) Date of Patent: Apr. 8, 2025

(54) INERTIAL MEASUREMENT UNIT

(71) Applicant: SEIKO EPSON CORPORATION, Tokyo (JP)

(72) Inventors: Kazuyoshi Takeda, Chino (JP); Yoshihiro Kobayashi, Komagane (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/569,956

(22) Filed: Jan. 6, 2022

(65) Prior Publication Data

US 2022/0221487 A1 Jul. 14, 2022

(30) Foreign Application Priority Data

Jan. 8, 2021 (JP) .................. 2021-002129

(51) Int. Cl.
| | |
|---|---|
| G01P 15/02 | (2013.01) |
| G01P 1/00 | (2006.01) |
| G01P 1/02 | (2006.01) |
| G01P 3/02 | (2006.01) |
| G01P 15/18 | (2013.01) |

(52) U.S. Cl.
CPC .............. G01P 15/02 (2013.01); G01P 1/003 (2013.01); G01P 1/02 (2013.01); G01P 3/02 (2013.01); G01P 15/18 (2013.01)

(58) Field of Classification Search
CPC .. G01P 1/02; G01P 1/023; G01P 1/003; G01P 15/02; G01P 15/18; G01P 3/02
See application file for complete search history.

(56) References Cited

U.S. PATENT DOCUMENTS

| | | | |
|---|---|---|---|
| 6,398,252 B1* | 6/2002 | Ishikawa ................. | B60T 8/171 280/727 |
| 9,052,220 B2* | 6/2015 | Sakuma ................. | G01D 11/30 |
| 2005/0011709 A1* | 1/2005 | Yang ....................... | F16F 15/04 188/267 |
| 2007/0074570 A1* | 4/2007 | Braman ................. | F16F 15/08 73/504.14 |

(Continued)

FOREIGN PATENT DOCUMENTS

| | | |
|---|---|---|
| CN | 207487690 U | 6/2018 |
| JP | 2003-002299 | 1/2003 |

(Continued)

OTHER PUBLICATIONS

Translation of CN207487690.*

(Continued)

*Primary Examiner* — Helen C Kwok
(74) *Attorney, Agent, or Firm* — Rankin, Hill & Clark LLP

(57) ABSTRACT

An inertial measurement unit includes: a sensor unit including an inertial sensor, a case accommodating the inertial sensor, and a first fixing part having the case fixed thereto; an elastic member having a first elastic member mainly damping a vibration at a predetermined frequency in a first direction and a second elastic member mainly damping a vibration at a predetermined frequency in a second direction that is different from the first direction; a second fixing part where the sensor unit and the elastic member are arranged; and a fixing member fixing the sensor unit and the elastic member to the second fixing part.

4 Claims, 10 Drawing Sheets

(56) References Cited

U.S. PATENT DOCUMENTS

| | | | | |
|---|---|---|---|---|
| 2008/0034865 | A1* | 2/2008 | Matsunaga | G01C 19/56 |
| | | | | 73/510 |
| 2010/0032876 | A1* | 2/2010 | Hiley | F16F 15/02 |
| | | | | 248/614 |
| 2010/0089155 | A1* | 4/2010 | Sugihara | G01C 21/166 |
| | | | | 73/497 |
| 2012/0239343 | A1* | 9/2012 | Borkholder | A42B 3/046 |
| | | | | 702/139 |
| 2016/0291050 | A1* | 10/2016 | Ehrenpfordt | G01C 19/5783 |
| 2019/0120870 | A1* | 4/2019 | Cvach | H05K 7/142 |
| 2021/0197836 | A1* | 7/2021 | Kihara | G01P 3/44 |

FOREIGN PATENT DOCUMENTS

| | | | |
|---|---|---|---|
| JP | 2010-258734 | | 11/2010 |
| JP | 205186542 | * | 4/2016 |
| JP | 2017-44313 A | | 3/2017 |
| JP | 2021-099231 | | 7/2021 |

OTHER PUBLICATIONS

Translation of CN205186542.*
Yang Lixi, Inertial Technology Handbook, Dec. 2013, pp. 329-332, China Astronautic Publishing House; English translation included (15 pages).

* cited by examiner

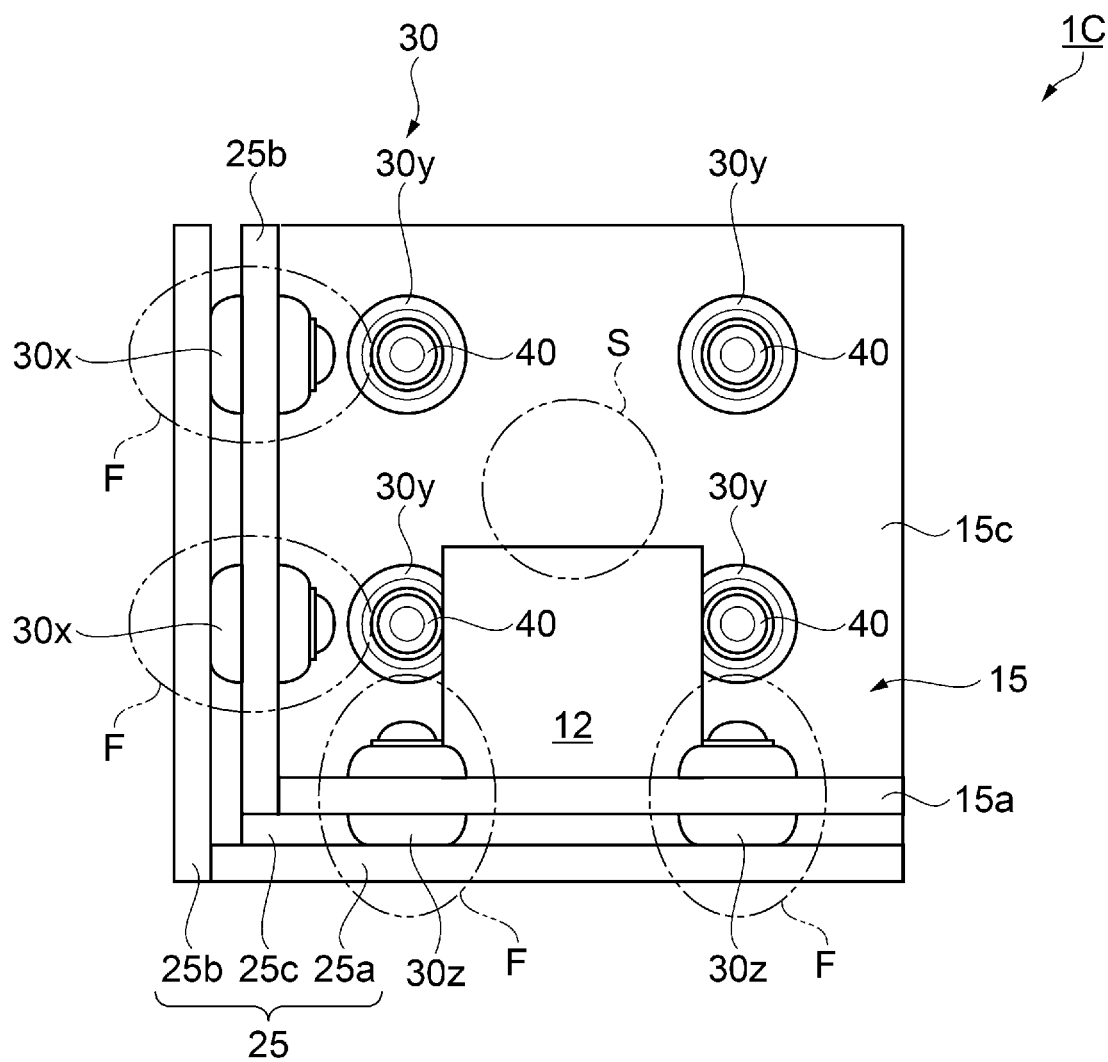

INERTIAL MEASUREMENT UNIT

The present application is based on, and claims priority from JP Application Serial Number 2021-002129, filed Jan. 8, 2021, the disclosure of which is hereby incorporated by reference herein in its entirety.

BACKGROUND

1. Technical Field

The present disclosure relates to an inertial measurement unit.

2. Related Art

An inertial measurement unit (IMU) having a plurality of sensors such as an angular velocity sensor and an acceleration sensor and used to measure an amount of displacement of a building, a structure or the like is known. In the related-art inertial measurement unit, a malfunction due to a vibration, and a vibration rectification error (VRE) due to a vibration at a non-measurement target frequency that is different from a measurement target frequency, may occur, posing a risk of inducing a measurement error in the measurement target frequency range. Therefore, an inertial measurement unit that restrains a vibration at a non-measurement target frequency by a mechanical filter is proposed.

For example, JP-A-2010-258734 discloses an oven controlled crystal oscillator having a gel bushing as a mechanical filter. According to JP-A-2010-258734, a gel bushing is provided in the four corners of a sub substrate where the oven controlled crystal oscillator is installed, thus restraining an unwanted vibration at a non-measurement target frequency.

However, the gel bushings in the four corners described in JP-A-2010-258734 are arranged with the axial directions thereof laid parallel to each other along the same direction. Therefore, for example, a vibration along the Z-axis direction, which is the axial direction, is restrained, whereas vibrations along the X and Y-axis directions, which are not the axial direction, are restrained to a lesser extent. In this case, mechanical filter characteristics for a measured acceleration value in the axial direction of the mechanical filter (for example, Z-axis) and for measured acceleration values in the other directions (for example, X and Y-axis directions) are different. Therefore, the combined filter characteristic of the plurality of mechanical filters is anisotropic, making it difficult to evaluate an acceleration using the three axes. There is also a problem in that the VRE restraining effect is lower in the directions in which the filter characteristic is lower (for example, X and Y-axis directions), increasing the vibration rectification error in the measured acceleration value.

SUMMARY

An inertial measurement unit includes: a sensor unit including an inertial sensor, a case accommodating the inertial sensor, and a first fixing part having the case fixed thereto; an elastic member having a first elastic member mainly damping a vibration at a predetermined frequency in a first direction and a second elastic member mainly damping a vibration at a predetermined frequency in a second direction that is different from the first direction; a second fixing part where the sensor unit and the elastic member are arranged; and a fixing member fixing the sensor unit and the elastic member to the second fixing part. The fixing member has a first fixing member penetrating the sensor unit and the first elastic member and pressing the first elastic member, and a second fixing member penetrating the sensor unit and the second elastic member and pressing the second elastic member.

BRIEF DESCRIPTION OF THE DRAWINGS

FIG. 10 is a side view showing the schematic structure of the inertial measurement unit shown in FIG. 8.

DESCRIPTION OF EXEMPLARY EMBODIMENTS

Embodiments of an inertial measurement unit will now be described with reference to the drawings. In the embodiments below, an X-axis, a Y-axis, and a Z-axis are illustrated as three axes orthogonal to each other. A direction along the X-axis is referred to as an "X-axis direction". A direction along the Y-axis is referred to as a "Y-axis direction". A direction along the Z-axis is referred to as a "Z-axis direction". Along each of the X-axis, the Y-axis, and the Z-axis, the direction of an arrow head is referred to as a positive (+) direction, and a direction opposite to the direction of the arrow head is referred to as a negative (−) direction. An object viewed from the positive Z-axis direction is referred to as being viewed in a plan view. In the embodiments below, an exterior case and a control circuit or the like of the inertial measurement unit are not illustrated.

1. First Embodiment

An inertial measurement unit 1 will now be described with reference to FIGS. 1 to 3.

Figure 1:
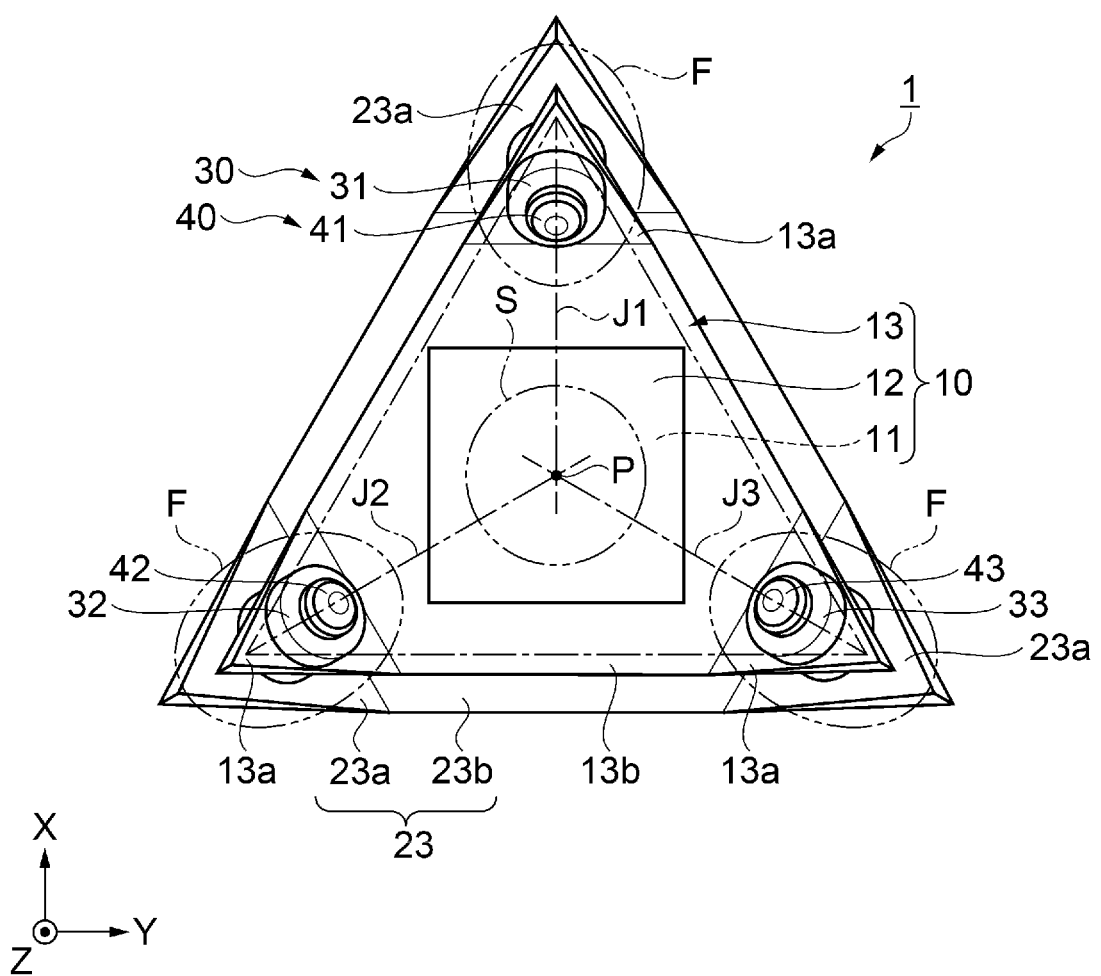
FIG. 1 is a plan view showing a schematic structure of an inertial measurement unit according to a first embodiment.
Figure 2:
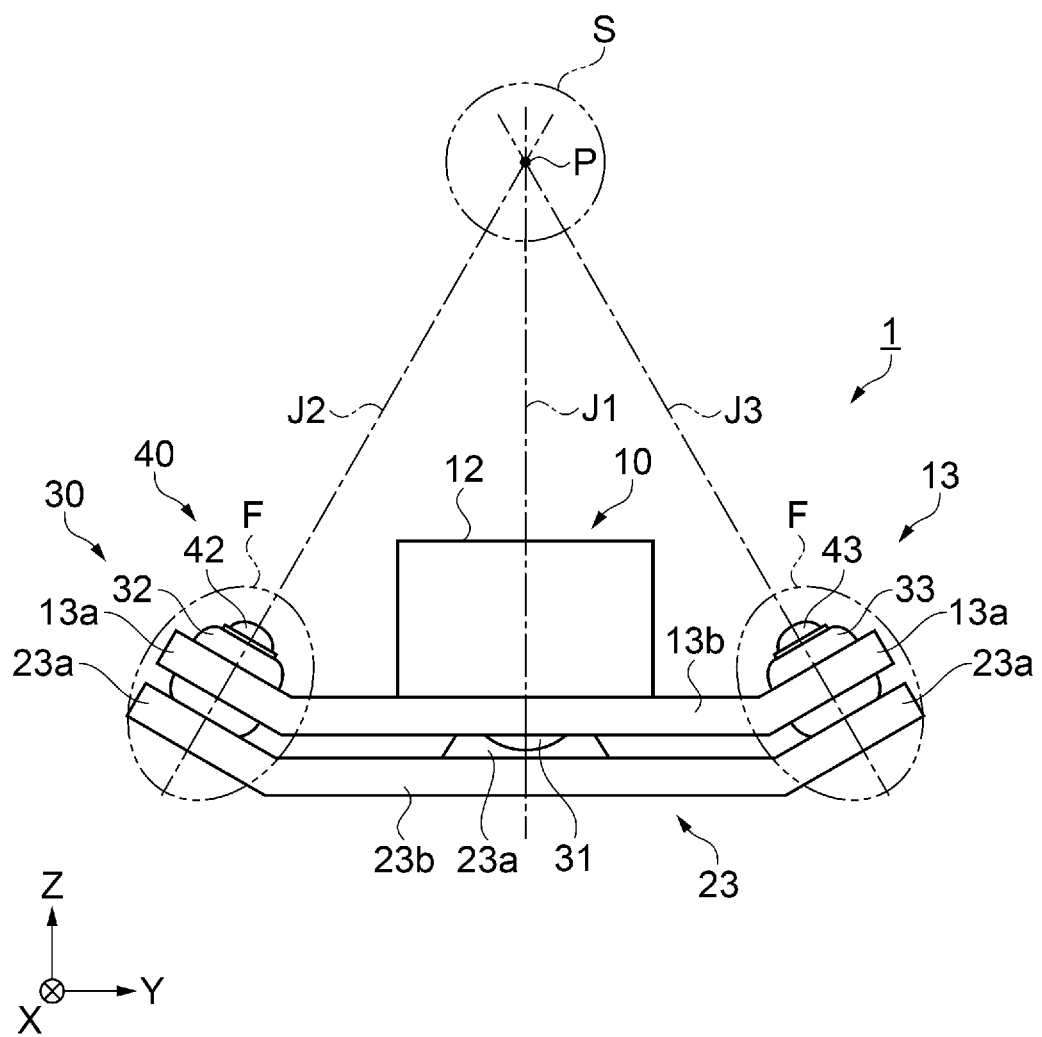
FIG. 2 is a schematic side view of the inertial measurement unit shown in FIG. 1, as viewed from a negative X-axis direction.
Figure 3:
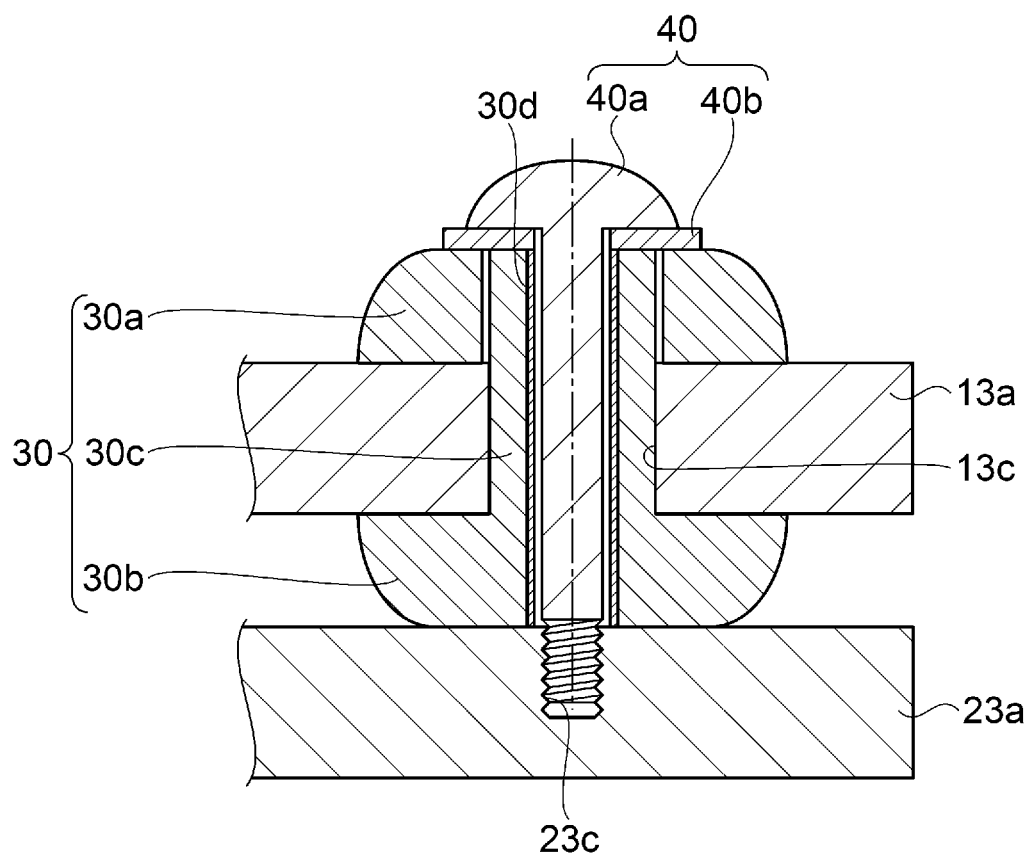
FIG. 3 is a partial cross-sectional view showing peripheries of an elastic member provided in the inertial measurement unit.

As shown in FIGS. 1 and 2, the inertial measurement unit 1 has a sensor unit 10, an elastic member 30, a second substrate 23 as a second fixing part where the sensor unit 10 and the elastic member 30 are arranged, and a fixing member 40 fixing the sensor unit 10 and the elastic member 30 to the second substrate 23.

The sensor unit 10 includes an inertial sensor 11, a case 12 accommodating the inertial sensor 11, and a first substrate 13 as a first fixing part having the case 12 fixed thereto. The sensor unit 10 functions as a 6-axis motion sensor having a 3-axis acceleration sensor and a 3-axis angular velocity sensor.

The inertial sensor 11 has a 3-axis acceleration sensor and a 3-axis angular velocity sensor. The case 12 has an outer shape of a rectangular parallelepiped that is substantially square as viewed in a plan view. Inside the case 12, the inertial sensor 11, and a control IC and a connector or the like, not illustrated, for causing the inertial sensor 11 to function, are accommodated.

In the case 12, a screw hole, not illustrated, is formed near two diagonally opposite vertices of the square. The case 12 is thus fixed to the first substrate 13 with a screw or the like. The method for fixing the case 12 to the first substrate 13 is not limited to using a screw. The case 12 can also be fixed to the first substrate 13 by welding, an adhesive, caulking or the like.

The first substrate 13 is a substrate in the shape of an equilateral triangle as viewed in a plan view. The first substrate 13 has three slope parts 13a, and a planar part 13b having front and back surfaces along the XY plane.

The slope part 13a is a triangular area provided near the vertices of the first substrate 13. The front surface of the slope part 13a and the front surface of the planar part 13b next to the slope part 13a form an angle smaller than 180°. The slope part 13a is sloped in relation to the planar part 13b.

The planar part 13b is a hexagonal area excluding the slope parts 13a of the first substrate 13. The planar part 13b has a flat plate-like shape along the XY plane and has the case 12 fixed thereto substantially at the center on the front surface side.

In the negative Z-axis direction of the first substrate 13, the second substrate 23 is arranged with a predetermined space from the first substrate 13. The second substrate 23 is a substrate in the shape of an equilateral triangular having longer sides than the first substrate 13, as viewed in a plan view. The second substrate 23 has three slope parts 23a, and a planar part 23b having front and back surfaces along the XY plane.

The slope part 23a is a triangular area provided near the three vertices of the second substrate 23. The front surface of the slope part 23a and the front surface of the planar part 23b next to the slope part 23a form an angle smaller than 180°. The slope part 23a is sloped in relation to the planar part 23b.

The planar part 23b is a hexagonal area excluding the slope parts 23a of the second substrate 23. The planar part 23b has a flat plate-like shape along the XY plane. A vibration measurement surface of a measurement target can be attached to the back surface of the planar part 23b, which is opposite to the front surface facing the first substrate 13, by using a magnet, an adhesive or the like, and the inertial measurement unit 1 can thus be installed.

The elastic member 30 is arranged at the slope parts 13a of the first substrate 13 and the slope parts 23a of the second substrate 23. The elastic member 30 is a mechanical filter that can restrain an unwanted vibration and damp a particular frequency. The mechanical filter is a so-called gel bushing formed of a silicone rubber and bonds the first substrate 13 and the second substrate 23 together via a flexible structure. The filter characteristic of the mechanical filter includes a low-pass filter characteristic that restrains frequencies out of a measurement frequency range of the acceleration sensor.

A configuration in which the first substrate 13 and the second substrate 23 are fixed, using the elastic member 30 and the fixing member 40, will now be described with reference to FIG. 3.

In the first substrate 13, an opening 13c vertically penetrating the first substrate 13 to the front and back surfaces substantially at the center of the slope part 13a is provided. In the opening 13c, the elastic member 30 and the fixing member 40 are inserted. In the second substrate 23, a screw hole 23c vertically extending from the front surface substantially at the center of the slope part 23a is provided. A spiral thread is formed on the inner surface of the screw hole 23c.

The elastic member 30 has a first part 30a arranged at the front surface side of the slope part 13a, a second part 30b arranged opposite the first part 30a and in contact with the slope part 23a, and a third part 30c coupled to the second part 30b at one end and located inside the opening 13c.

The third part 30c of the elastic member 30 is inserted in the opening 13c, thus causing the first part 30a and the other end of the third part 30c to engage with each other. Thus, the elastic member 30 is arranged in such a way as to hold the slope part 13a from the front surface and the back surface via the opening 13c. At a center axis part of the elastic member 30, a penetration hole along the direction of extension of the third part 30c is provided. At the inner surface of the penetration hole, a cylindrical control member 30d is provided. As the control member 30d is arranged, the amount of pressing on the elastic member 30 by the fixing member 40 can be controlled. The control member 30d is formed of a member with a higher rigidity than the elastic member 30 and thus prevents the elastic member 30 from being largely deformed and deteriorating in anti-vibration capability.

The fixing member 40 includes a male screw-type screw 40a that penetrates the first substrate 13 of the sensor unit 10 and the elastic member 30 and has a distal end thereof spirally fitted in the screw hole 23c provided in the second substrate 23 while pressing the elastic member 30 and thus fixes the elastic member 30, and a washer 40b that is arranged between a head part of the fixing member 40 and the elastic member 30 and can uniformly press the elastic member 30 when the screw 40a is tightened.

The screw 40a is not limited to a male screw type. A bolt or a rivet that penetrates the elastic member 30 and can fix the elastic member 30 to the second substrate 23 while pressing the elastic member 30 can be used.

As shown in FIGS. 1 and 2, the inertial measurement unit 1 according to this embodiment has a first elastic member 31, a second elastic member 32, and a third elastic member 33, as the elastic member 30, and has a first fixing member 41 penetrating and pressing the first elastic member 31, a second fixing member 42 penetrating and pressing the second elastic member 32, and a third fixing member 43 penetrating and pressing the third elastic member 33, as the fixing member 40. Therefore, the first substrate 13 and the second substrate 23 are fixed together via the first elastic member 31, the second elastic member 32, and the third elastic member 33.

The elastic member 30 in the inertial measurement unit 1 according to this embodiment has an anisotropic filter characteristic F and can mainly damp a vibration at a predetermined frequency in a direction along center axes J1 to J3 of the fixing member 40 penetrating the elastic member 30.

In the inertial measurement unit 1 according to this embodiment, the first elastic member 31 mainly damping a vibration at a predetermined frequency in a first direction along the center axis J1 of the first fixing member 41, the second elastic member 32 mainly damping a vibration at a predetermined frequency in a second direction along the center axis J2 of the second fixing member 42, and the third elastic member 33 mainly damping a vibration at a predetermined frequency in a third direction along the center axis J3 of the third fixing member 43, are arranged at the three slope parts 13a, respectively.

The first direction, the second direction, and the third direction are different from each other. The slope parts 13a, 23a where the first elastic member 31 is provided are equivalent to a first area. The slope parts 13a, 23a where the second elastic member 32 is provided are equivalent to a second area. The planar parts 13b, 23b are equivalent to a third area.

The slope parts 13a, 23a are sloped in relation to the planar parts 13b, 23b. Therefore, the center axis J1 of the first fixing member 41, the center axis J2 of the second fixing member 42, and the center axis J3 of the third fixing member 43, arranged at the slope parts 13a, 23a, are sloped toward the center of the sensor unit 10 and intersect each other at a point of intersection P. The screw holes 23c in the slope parts 23a, through which the center axes J1, J2, J3 pass, are located at the vertices of the equilateral triangle, as viewed in a plan view. The elastic member 30 is arranged in such a way that the equilateral triangle and the center axes J1, J2, J3 form a regular triangular pyramid.

This embodiment can achieve the effects described below.

The inertial measurement unit 1 includes: the sensor unit 10 including the inertial sensor 11, the case accommodating the inertial sensor 11, and the first substrate 13 as the first fixing part having the case 12 fixed thereto; the elastic member 30 having the first elastic member 31 mainly damping a vibration at a predetermined frequency in the first direction, the second elastic member 32 mainly damping a vibration at a predetermined frequency in the second direction, which is different from the first direction, and the third elastic member 33 mainly damping a vibration at a predetermined frequency in the third direction, which is different from the first direction and the second direction; the second substrate 23, where the sensor unit 10 and the elastic member 30 are arranged; and the fixing member 40 fixing the sensor unit 10 and the elastic member 30 to the second substrate 23. The fixing member 40 has the first fixing member 41 penetrating the sensor unit 10 and the first elastic member 31 and pressing the first elastic member 31, the second fixing member 42 penetrating the sensor unit 10 and the second elastic member 32 and pressing the second elastic member 32, and the third fixing member 43 penetrating the sensor unit 10 and the third elastic member 33 and pressing the third elastic member 33.

In the elastic member 30 having the anisotropic filter characteristic F in different directions in this way, the first elastic member 31, the second elastic member 32, and the third elastic member 33 are arranged in such a way that the center axes J1, J2, J3 form a regular triangular pyramid. In this configuration, a combined filter characteristic S is not anisotropic near the point of intersection P and an isotropic filter characteristic that is equal on the three axes of the X-axis, the Y-axis, and the Z-axis is achieved. Thus, the inertial measurement unit 1 damping a vibration at a predetermined frequency in three different directions can be provided.

Also, this filter characteristic is the same for the measured value on each axis of the 3-axis acceleration sensor. Therefore, the evaluation of an input vibration using 3-axis acceleration values becomes easier.

Moreover, since the isotropic filter characteristic that is equal on the three axes is achieved, the VRE restraining effect on each of the three axes is increased. The inertial measurement unit 1 having less vibration rectification error in the measured acceleration value can be provided.

Also, since the control circuit evenly restrains vibrations in all directions, the evaluation of malfunctions becomes easier.

2. Second Embodiment

An inertial measurement unit 1A according to this embodiment will now be described with reference to FIGS. 4 and 5.

In the description of the inertial measurement unit 1A, the same components as in the foregoing embodiment are denoted by the same reference signs and the description thereof may be omitted or simplified.

Figure 4:
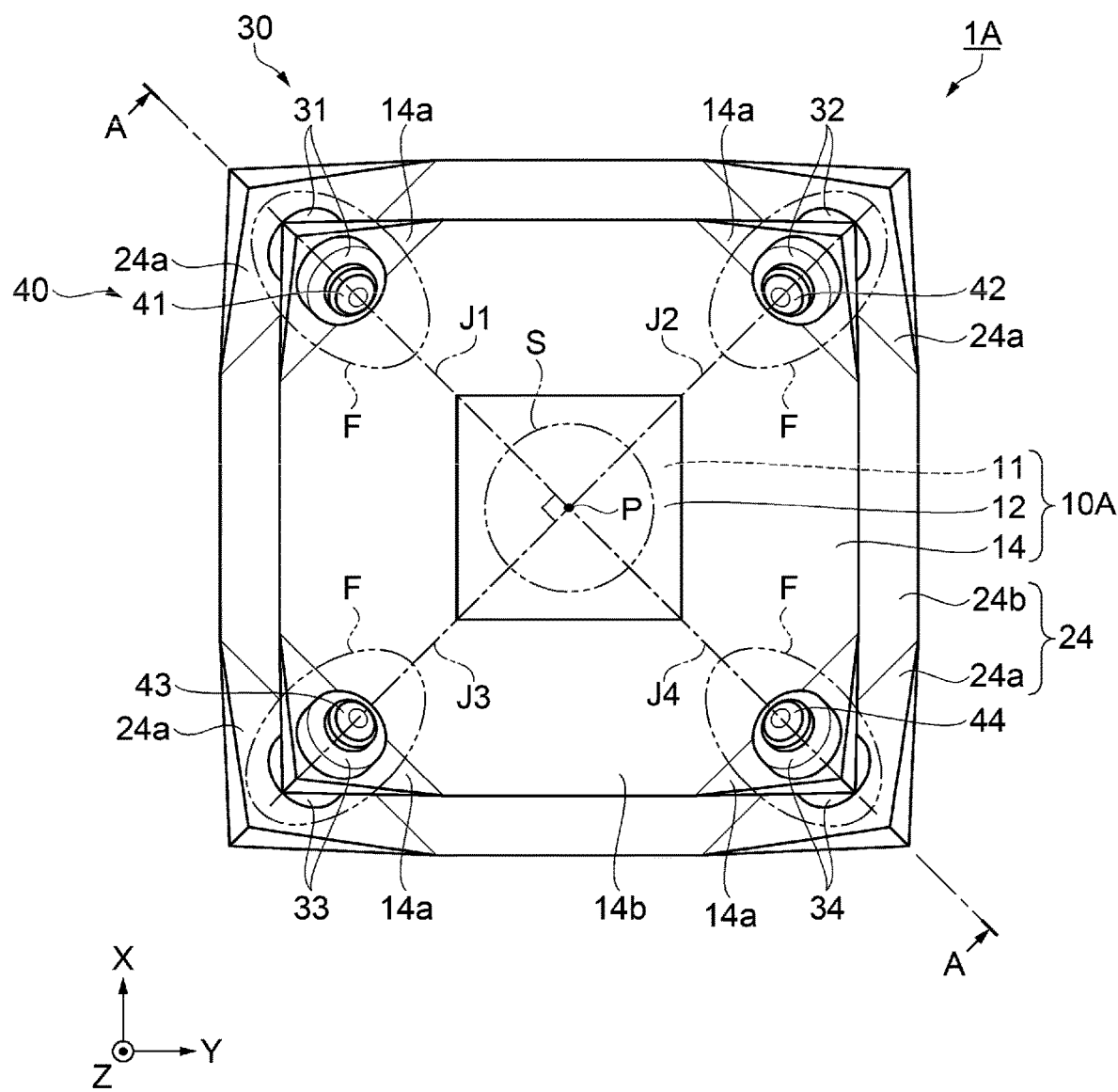
FIG. 4 is a plan view showing a schematic structure of an inertial measurement unit according to a second embodiment.
Figure 5:
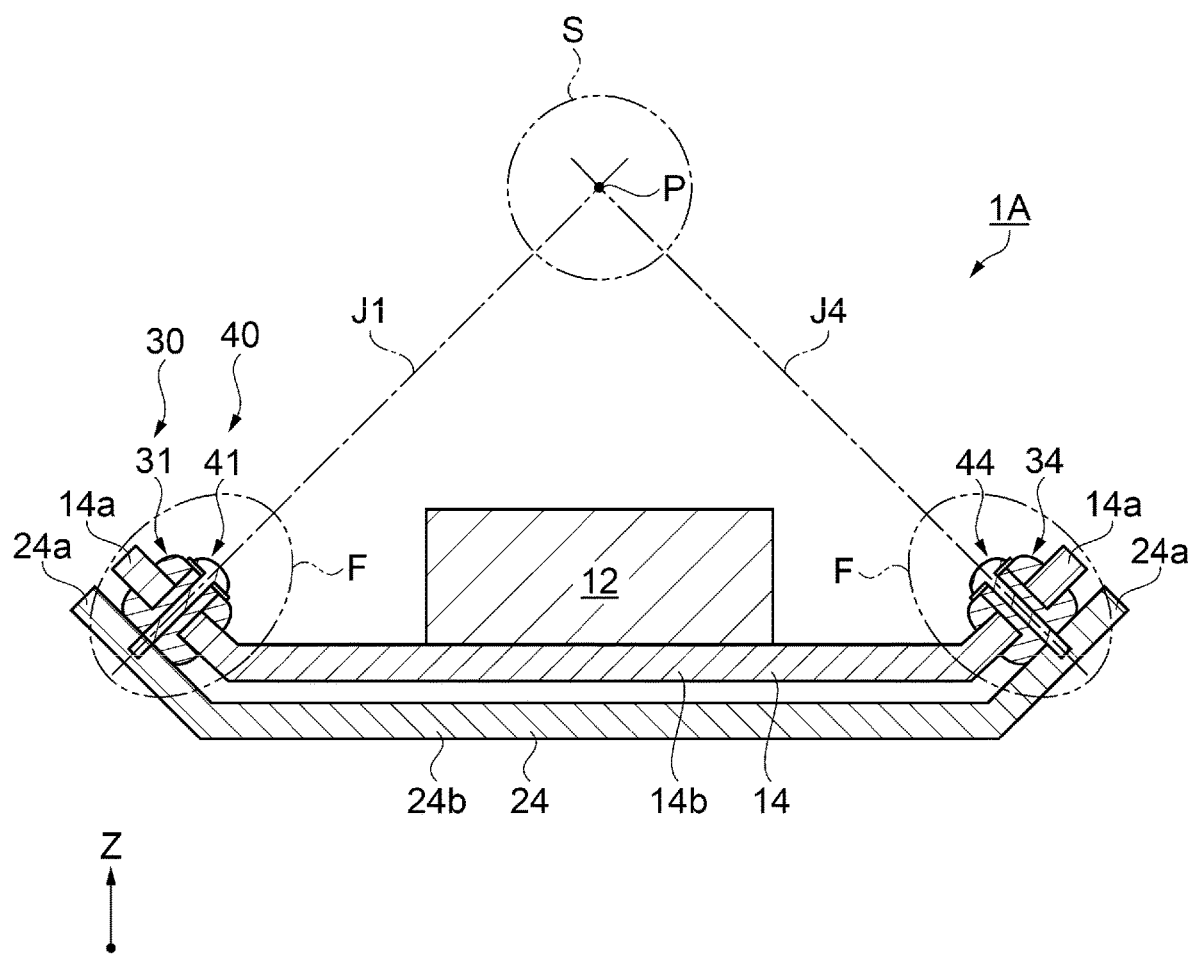
FIG. 5 is a cross-sectional view of the schematic structure of the inertial measurement unit shown in FIG. 4, taken along a line A-A.

As shown in FIGS. 4 and 5, the inertial measurement unit 1A according to this embodiment has a sensor unit 10A, an elastic member 30, a second substrate 24 as a second fixing part where the sensor unit 10A and the elastic member 30 are arranged, and a fixing member 40 fixing the sensor unit 10A and the elastic member 30 to the second substrate 24.

The sensor unit 10A includes an inertial sensor 11, a case 12 accommodating the inertial sensor 11, and a first substrate 14 as a first fixing part having the case 12 fixed thereto. The sensor unit 10A functions as a 6-axis motion sensor having a 3-axis acceleration sensor and a 3-axis angular velocity sensor.

The inertial sensor 11 and the case 12 are similar to those in the first embodiment. In the case 12, a screw hole, not illustrated, is formed near two diagonally opposite vertices of the square. The case 12 is thus fixed to the first substrate 14 with a screw or the like.

The first substrate 14 is a substrate in a square shape as viewed in a plan view. The first substrate 14 has four slope parts 14a, and a planar part 14b having front and back surfaces along the XY plane.

The slope part 14a is a triangular area provided near the four vertices of the first substrate 14. The front surface of the slope part 14a and the front surface of the planar part 14b next to the slope part 14a form an angle smaller than 180°. The slope part 14a is sloped in relation to the planar part 14b.

The planar part 14b is an octagonal area excluding the slope parts 14a of the first substrate 14. The planar part 14b has a flat plate-like shape along the XY plane and has the case 12 fixed thereto substantially at the center on the front surface side.

In the negative Z-axis direction of the first substrate 14, the second substrate 24 is arranged with a predetermined space from the first substrate 14. The second substrate 24 is a substrate in a square shape having longer sides than the first substrate 14, as viewed in a plan view. The second substrate 24 has four slope parts 24a, and a planar part 24b having front and back surfaces along the XY plane.

The slope part 24a is a triangular area provided near the four vertices of the second substrate 24. The front surface of the slope part 24a and the front surface of the planar part 24b next to the slope part 24a form an angle smaller than 180°. The slope part 24a is sloped in relation to the planar part 24b.

The planar part 24b is an octagonal area excluding the slope parts 24a of the second substrate 24. The planar part 24b has a flat plate-like shape along the XY plane. A vibration measurement surface of a measurement target can be attached to the back surface of the planar part 24b, which is opposite to the front surface facing the first substrate 14, by using a magnet, an adhesive or the like, and the inertial measurement unit 1A can thus be installed.

The elastic member 30 is arranged at the slope parts 14a of the first substrate 14 and the slope parts 24a of the second substrate 24. The elastic member 30 bonds the first substrate 14 and the second substrate 24 together via a flexible structure.

The elastic member 30 is arranged in such a way as to hold the slope part 14a from the front surface and the back surface. The fixing member 40 penetrates the first substrate 14 of the sensor unit 10A and the elastic member 30 and has a distal end thereof spirally fitted in the screw hole provided in the second substrate 24 while pressing the elastic member 30 and thus fixes together the slope part 14a of the first substrate 14 and the slope part 24a of the second substrate 24.

The inertial measurement unit 1A according to this embodiment has a first elastic member 31, a second elastic member 32, a third elastic member 33, and a fourth elastic member 34, as the elastic member 30, and has a first fixing member 41 penetrating and pressing the first elastic member 31, a second fixing member 42 penetrating and pressing the second elastic member 32, a third fixing member 43 penetrating and pressing the third elastic member 33, and a fourth fixing member 44 penetrating and pressing the fourth elastic member 34, as the fixing member 40. Therefore, the first substrate 14 and the second substrate 24 are fixed together via the first elastic member 31, the second elastic member 32, the third elastic member 33, and the fourth elastic member 34.

The elastic member 30 in the inertial measurement unit 1A according to this embodiment has an anisotropic filter characteristic F and can mainly damp a vibration at a predetermined frequency in a direction along center axes J1 to J4 of the fixing member 40 penetrating the elastic member 30.

In the inertial measurement unit 1A according to this embodiment, the first elastic member 31 mainly damping a vibration at a predetermined frequency in a first direction along the center axis J1 of the first fixing member 41, the second elastic member 32 mainly damping a vibration at a predetermined frequency in a second direction along the center axis J2 of the second fixing member 42, the third elastic member 33 mainly damping a vibration at a predetermined frequency in a third direction along the center axis J3 of the third fixing member 43, and the fourth elastic member 34 mainly damping a vibration at a predetermined frequency in a fourth direction along the center axis J4 of the fourth fixing member 44, are arranged at the four slope parts 14a, respectively.

The first direction, the second direction, the third direction, and the fourth direction are different from each other. The slope parts 14a, 24a where the first elastic member 31 is provided are equivalent to a first area. The slope parts 14a, 24a where the second elastic member 32 is provided are equivalent to a second area. The planar parts 14b, 24b are equivalent to a third area.

The slope parts 14a, 24a are sloped in relation to the planar parts 14b, 24b. Therefore, the center axis J1 of the first fixing member 41, the center axis J2 of the second fixing member 42, the center axis J3 of the third fixing member 43, and the center axis J4 of the fourth fixing member 44, arranged at the slope parts 14a, 24a, are sloped toward the center of the sensor unit 10A and intersect each other at a point of intersection P. The screw holes in the slope parts 24a, through which the center axes J1, J2, J3, J4 pass, are located at the vertices of the square, as viewed in a plan view. Each two neighboring axes of the sloped center axes J1, J2, J3, J4 intersect each other at an angle of 90°. The elastic member 30 is arranged in such a way that the square and the center axes J1, J2, J3, J4 form a regular square pyramid.

The inertial measurement unit 1A according to this embodiment can achieve the effects described below.

The elastic member 30 of the inertial measurement unit 1A has the fourth elastic member 34 mainly damping a vibration at a predetermined frequency in the fourth direction, which is different from the first direction, the second direction, and the third direction. The fixing member 40 has the fourth fixing member 44 penetrating the sensor unit 10A and the fourth elastic member 34 and pressing the fourth elastic member 34. In this configuration, as the elastic member 30 having the anisotropic filter characteristic F in different directions, the first elastic member 31, the second elastic member 32, the third elastic member 33, and the fourth elastic member 34 are arranged in such a way that the center axes J1, J2, J3m J4 form a regular square pyramid, and an isotropic filter characteristic that is equal on the three axes of the X-axis, the Y-axis, and the Z-axis is achieved. Thus, the inertial measurement unit 1A can achieve effects similar to those of the inertial measurement unit 1 according to the first embodiment.

3. Third Embodiment

An inertial measurement unit 1B according to this embodiment will now be described with reference to FIGS. 6 and 7.

The inertial measurement unit 1B differs from the foregoing inertial measurement unit 1A in having a sensor unit 10B instead of the sensor unit 10A. In the description of the inertial measurement unit 1B, the same components as in the foregoing embodiments are denoted by the same reference signs and the description thereof may be omitted or simplified.

Figure 6:
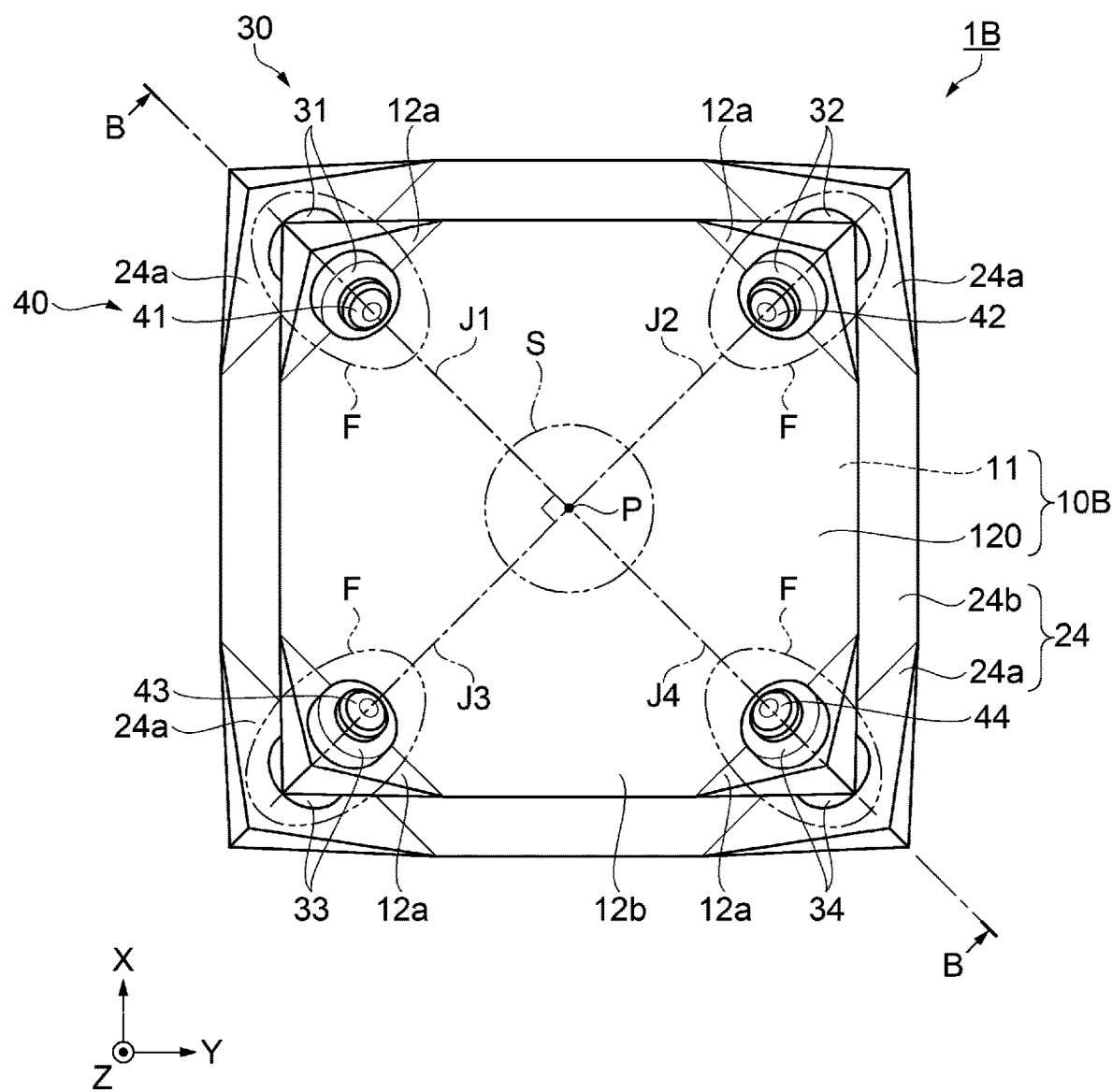
FIG. 6 is a plan view showing a schematic structure of an inertial measurement unit according to a third embodiment.
Figure 7:
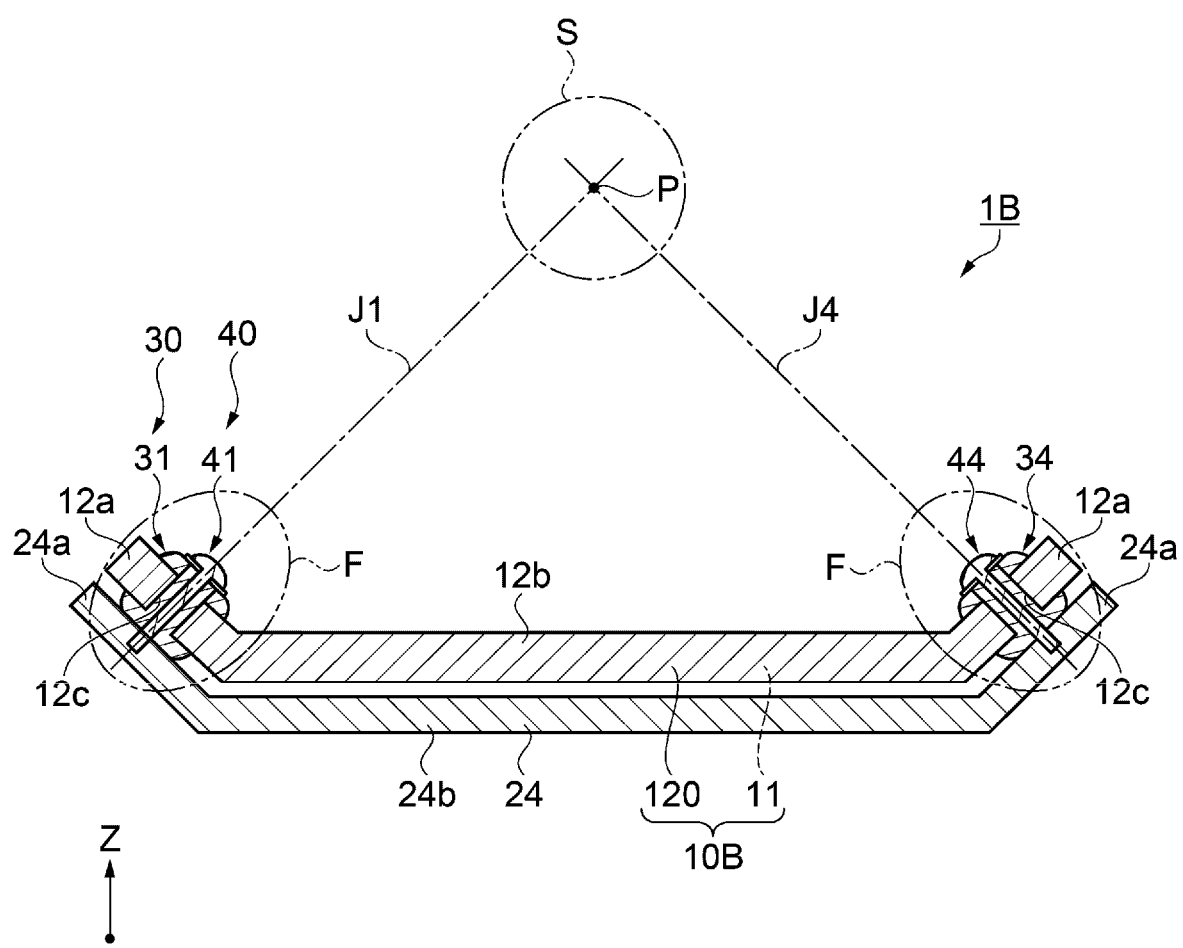
FIG. 7 is a cross-sectional view of the schematic structure of the inertial measurement unit shown in FIG. 6, taken along a line B-B.

As shown in FIGS. 6 and 7, the inertial measurement unit 1B according to this embodiment has the sensor unit 10B, an elastic member 30, a second substrate 24 as a second fixing part where the sensor unit 10B and the elastic member 30 are arranged, and a fixing member 40 fixing the sensor unit 10B and the elastic member 30 to the second substrate 24.

The sensor unit 10B includes an inertial sensor 11 and a case 120 accommodating the inertial sensor 11 and functions as a 6-axis motion sensor having a 3-axis acceleration sensor and a 3-axis angular velocity sensor.

The case 120 is square as viewed in a plan view and has four slope parts 12a, and a planar part 12b having front and back surfaces along the XY plane.

The slope part 12a is a triangular area provided near the four vertices of the case 120. The front surface of the slope part 12a and the front surface of the planar part 12b next to the slope part 12a form an angle smaller than 180°. The slope part 12a is sloped in relation to the planar part 12b.

The planar part 12b is an octagonal area excluding the slope parts 12a of the case 120. The planar part 12b has a flat plate-like shape along the XY plane.

In the negative Z-axis direction of the case 120, the second substrate 24 is arranged with a predetermined space from the case 120. The second substrate 24 is a substrate in a square shape having longer sides than the case 120, as viewed in a plan view.

The elastic member 30 is arranged at the slope parts 12a of the case 120 and slope parts 24a of the second substrate 24.

In the case 120, an opening 12c vertically penetrating the case 120 to the front and back surfaces substantially at the center of the slope part 12a is provided. The elastic member 30 and the fixing member 40 are inserted in the opening 12c. The elastic member 30 bonds the case 120 and the second substrate 24 together via a flexible structure.

The elastic member 30 has a third part 30c thereof inserted in the opening 12c and is arranged in such a way as to hold the slope part 12a from the front surface and the back surface. The fixing member 40 penetrates the case 120 of the sensor unit 10B and the elastic member 30 and has a distal end thereof spirally fitted in a screw hole provided in the second substrate 24 while pressing the elastic member 30 and thus fixes together the slope part 12a of the case 120 and the slope part 24a of the second substrate 24.

In the inertial measurement unit 1B according to this embodiment, a first elastic member 31 mainly damping a vibration at a predetermined frequency in a first direction along a center axis J1 of a first fixing member 41, a second elastic member 32 mainly damping a vibration at a predetermined frequency in a second direction along a center axis J2 of a second fixing member 42, a third elastic member 33 mainly damping a vibration at a predetermined frequency in a third direction along a center axis J3 of a third fixing member 43, and a fourth elastic member 34 mainly damping a vibration at a predetermined frequency in a fourth direction along a center axis J4 of a fourth fixing member 44, are arranged at the four slope parts 12a, respectively.

The first direction, the second direction, the third direction, and the fourth direction are different from each other. The slope parts 12a, 24a where the first elastic member 31 is provided are equivalent to a first area. The slope parts 12a, 24a where the second elastic member 32 is provided are equivalent to a second area. The planar parts 12b, 24b are equivalent to a third area.

The slope parts 12a, 24a are sloped in relation to the planar parts 12b, 24b. Therefore, the center axis J1 of the first fixing member 41, the center axis J2 of the second fixing member 42, the center axis J3 of the third fixing member 43, and the center axis J4 of the fourth fixing member 44, arranged at the slope parts 12a, 24a, are sloped toward the center of the sensor unit 10B and intersect each other at a point of intersection P. The screw holes in the slope parts 24a, through which the center axes J1, J2, J3, J4 pass, are located at the vertices of the square, as viewed in a plan view. Each two neighboring axes of the sloped center axes J1, J2, J3, J4 intersect each other at an angle of 90°. The elastic member 30 is arranged in such a way that the square and the center axes J1, J2, J3, J4 form a regular square pyramid.

The inertial measurement unit 1B according to this embodiment can achieve the effects described below.

The elastic member 30 of the inertial measurement unit 1B has the fourth elastic member 34 mainly damping a vibration at a predetermined frequency in the fourth direction, which is different from the first direction, the second direction, and the third direction. The fixing member 40 has the fourth fixing member 44 penetrating the sensor unit 10B and the fourth elastic member 34 and pressing the fourth elastic member 34. In this configuration, as the elastic member 30 having an anisotropic filter characteristic F in different directions, the first elastic member 31, the second elastic member 32, the third elastic member 33, and the fourth elastic member 34 are arranged in such a way that the center axes J1, J2, J3m J4 form a regular square pyramid, and an isotropic filter characteristic that is equal on the three axes of the X-axis, the Y-axis, and the Z-axis is achieved. Thus, the inertial measurement unit 1B can achieve effects similar to those of the inertial measurement units according to the foregoing embodiments.

4. Fourth Embodiment

An inertial measurement unit 1C according to this embodiment will now be described with reference to FIGS. 8 and 10.

Figure 8:
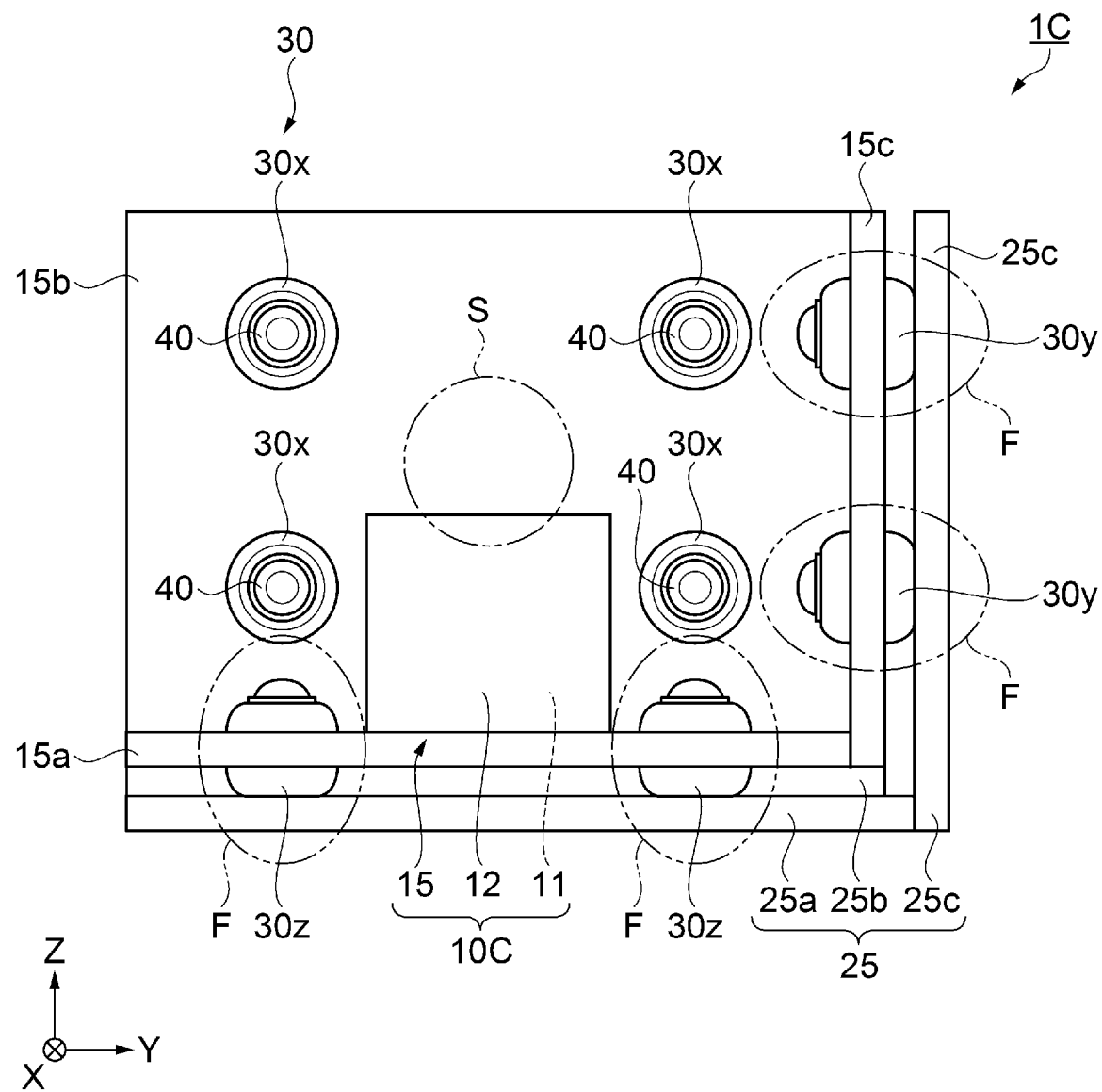
FIG. 8 is a front view showing a schematic structure of an inertial measurement unit according to a fourth embodiment.
Figure 9:
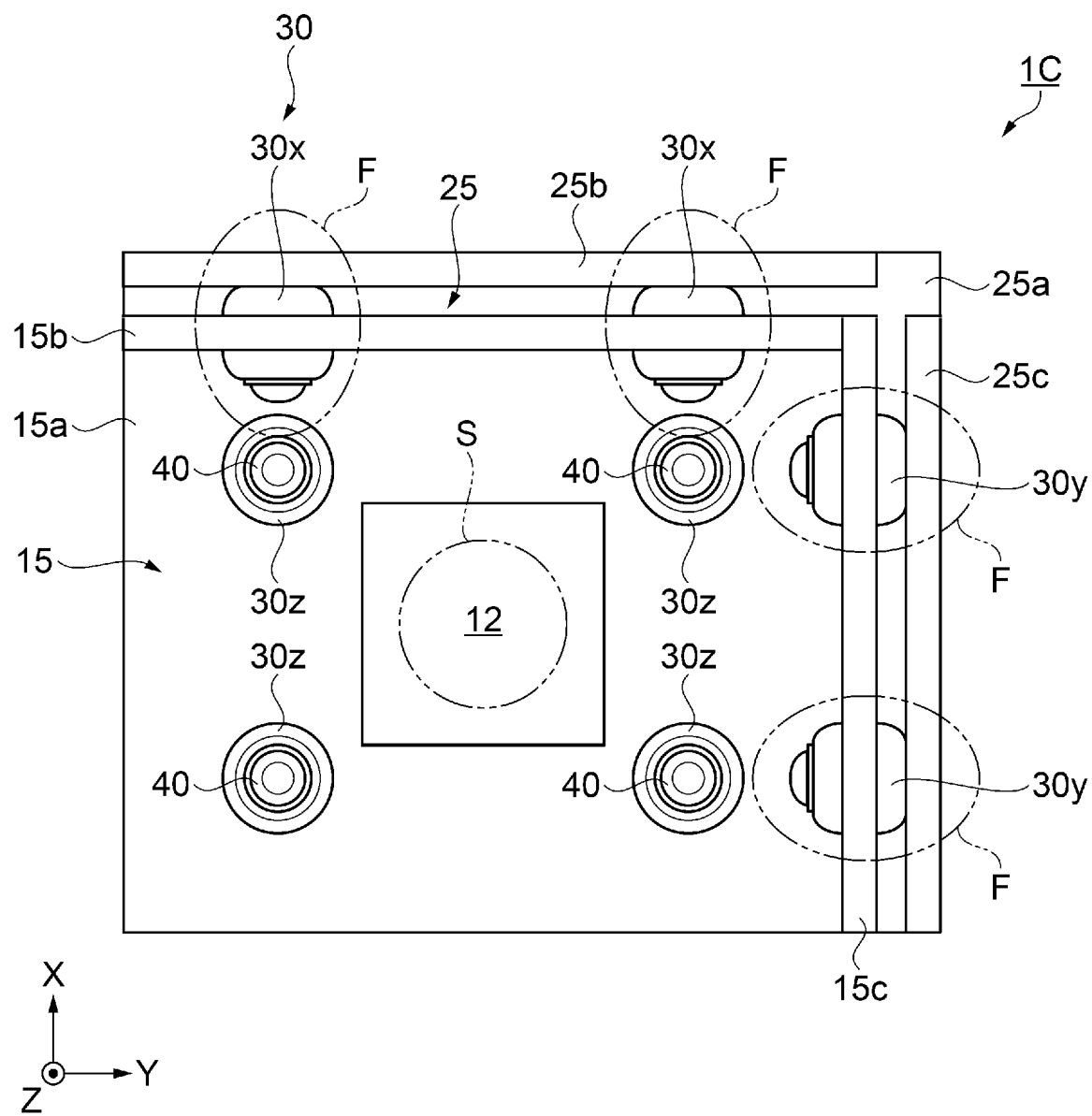
FIG. 9 is a plan view showing the schematic structure of the inertial measurement unit shown in FIG. 8.

As shown in FIGS. 8 and 10, the inertial measurement unit 1C has a sensor unit 10C, an elastic member 30, a second substrate 25 as a second fixing part where the sensor unit 10C and the elastic member 30 are arranged, and a fixing member 40 fixing the sensor unit 10C and the elastic member 30 to the second substrate 25.

The sensor unit 10C includes an inertial sensor 11, a case 12 accommodating the inertial sensor 11, and a first substrate 15 as a first fixing part having the case 12 fixed thereto. The sensor unit 10C functions as a 6-axis motion sensor having a 3-axis acceleration sensor and a 3-axis angular velocity sensor.

The inertial sensor 11 and the case 12 are similar to those in the first embodiment. In the case 12, a screw hole is formed near two diagonally opposite vertices of the square. The case 12 is thus fixed to the first substrate 15 with a screw or the like.

The first substrate 15 has substrates 15a, 15b, 15c. The first substrate 15 has an integrated configuration where sides of the substrates 15a, 15b, 15c are coupled to each other.

More specifically, the substrate 15a is a flat plate-like substrate having front and back surfaces along the XY plane. The substrate 15b is a flat plate-like substrate having front and back surfaces along the ZY plane. The substrate 15c is a flat plate-like substrate having front and back surfaces along the ZX plane.

The one side in the positive X-axis direction of the substrate 15a is coupled to the one side in the negative Z-axis direction of the substrate 15b. The one side in the positive Y-axis direction of the substrate 15a is coupled to the one side in the negative Z-axis direction of the substrate 15c. Also, the one side in the positive Y-axis direction of the substrate 15b and the one side in the positive X-axis direction of the substrate 15c are coupled together.

The first substrate 15 has the case 12 fixed substantially at the center on the front surface located in the positive Z-axis direction of the substrate 15a. In the case 12, a screw hole, not illustrated, is formed near two diagonally opposite vertices of the square. The case 12 is thus fixed to the substrate 15a with a screw or the like.

The second substrate 25 is arranged with a predetermined space from the first substrate 15.

The second substrate 25 has substrates 25a, 25b, 25c. The substrates 25a, 25b, 25c are coupled to each other at one side, forming an integrated configuration.

More specifically, the substrate 25a is a flat plate-like substrate having front and back surfaces along the XY plane. The substrate 25a and the substrate 15a are located via a predetermined space from each other. The substrate 25b is a flat plate-like substrate having front and back surfaces along the ZY plane. The substrate 25b and the substrate 15b are located via a predetermined space from each other. The substrate 25c is a flat plate-like substrate having front and back surfaces along the ZX plane. The substrate 25c and the substrate 15c are located via a predetermined space from each other.

In the second substrate 25, the one side in the positive X-axis direction of the substrate 25a is coupled to the one side in the negative Z-axis direction of the substrate 25b. The one side in the positive Y-axis direction of the substrate 25a is coupled to the one side in the negative Z-axis direction of the substrate 25c.

In the first substrate 15, an opening vertically penetrating the first substrate 15 to the front and back surfaces substantially is provided. In the opening, the elastic member 30 and the fixing member 40 are inserted. In the second substrate 25, a screw hole corresponding to the opening and vertically extending from the front surface is provided. A spiral thread is formed on the inner surface of the screw hole.

The elastic member 30 is arranged at the first substrate 15 and the second substrate 25. The elastic member 30 bonds the first substrate 15 and the second substrate 25 together via a flexible structure.

The elastic member 30 is arranged in such a way as to hold the first substrate 15 from the front surface and the back surface via the opening in the first substrate 15. The fixing member 40 penetrates the first substrate 15 of the sensor unit 10C and the elastic member 30 and has a distal end thereof spirally fitted in the screw hole provided in the second substrate 25 while pressing the elastic member 30 and thus fixes together the first substrate 15 and the second substrate 25.

The inertial measurement unit 1C according to this embodiment has elastic members 30x, 30y, 30z as the elastic member 30.

The elastic member 30z is provided at four positions on the substrate 15a and has a filter characteristic F of mainly damping a vibration at a predetermined frequency in a third direction along the Z-axis direction. The elastic member 30x is provided at four positions on the substrate 15b and has a filter characteristic F of mainly damping a vibration at a predetermined frequency in a first direction along the X-axis direction. The elastic member 30y is provided at four positions on the substrate 15c and has a filter characteristic F of mainly damping a vibration at a predetermined frequency in a second direction along the Y-axis direction.

The inertial measurement unit 1C according to this embodiment can achieve the effects described below.

The inertial measurement unit 1C has the elastic members 30x, 30y, 30z and therefore can achieve a filter characteristic F on the X, Y, and Z-axes. Therefore, the combined filter characteristic S of the elastic member 30 is not anisotropic and an isotropic filter characteristic that is equal on the three axes is achieved. Thus, the inertial measurement unit 1C can achieve effects similar to those of the inertial measurement units according to the foregoing embodiments.

What is claimed is:

1. An inertial measurement unit comprising:
a sensor unit including an inertial sensor, a case accommodating the inertial sensor, and a first fixing part having the case fixed thereto;
an elastic member having a first elastic member mainly damping a vibration at a predetermined frequency in a first direction, a second elastic member mainly damping a vibration at a predetermined frequency in a second direction that is different from the first direction, and a third elastic member mainly damping a vibration at a predetermined frequency in a third direction that is different from the first direction and the second direction;
a second fixing part where the sensor unit and the elastic member are arranged; and
a fixing member fixing the sensor unit and the elastic member to the second fixing part,
wherein the fixing member having a first fixing member penetrating the sensor unit and the first elastic member and pressing the first elastic member, a second fixing member penetrating the sensor unit and the second elastic member and pressing the second elastic member, and a third fixing member penetrating the sensor unit and the third elastic member and pressing the third elastic member,
the first fixing part and the second fixing part are fixed together via the first elastic member, the second elastic member, and the third elastic member,
each of the first fixing part and the second fixing part has a triangular shape with a first area at a first vertex, a second area at a second vertex, a third area at a third vertex, and a fourth area between the first vertex, the second vertex and the third vertex, wherein the first area, the second area, and the third area are all sloped in relation to the fourth area, toward a center of the fourth area,
in each of the first fixing part and the second fixing part, the first elastic member and the first fixing member are provided at the first area, the second elastic member and the second fixing member are provided at the second area, and the third elastic member and the third fixing member are provided at the third area,
the first elastic member is provided in such a way that a center axis of the first fixing member penetrating the first elastic member is sloped toward a center of the sensor unit, the second elastic member is provided in such a way that a center axis of the second fixing member penetrating the second elastic member is sloped toward the center of the sensor unit, and the third elastic member is provided in such a way that a center axis of the third fixing member penetrating the third elastic member is sloped toward the center of the sensor unit, so that the first center axis, the second center axis, and the third center axis form a regular triangular pyramid with an apex at a point of intersection of the first center axis, the second center axis, and the third center axis,
the first fixing part includes a first opening into which the first fixing member is inserted, a second opening into which the second fixing member is inserted, and a third opening into which the third fixing member is inserted,
each of the first elastic member, the second elastic member, and the third elastic member include a first part, a second part and a third part,
the first part of each of the first elastic member, the second elastic member, and the third elastic member is arranged at one surface side of the first fixing part,
the second part of each of the first elastic member, the second elastic member, and the third elastic member is arranged at an opposite surface side of the first fixing part opposite to the one surface side of the first fixing part, so that the first fixing part is disposed between the first part and the second part of each of the first elastic member, the second elastic member, and the third elastic member, the second part of each of the first elastic member, the second elastic member, and the third elastic member being in contact with the second fixing part, the third part of the first elastic member is disposed in the first opening, is coupled with the second part of the first elastic member, and engages with the first part of the first elastic member,
the third part of the second elastic member is disposed in the second opening, is coupled with the second part of the second elastic member, and engages with the first part of the second elastic member,
the third part of the third elastic member is disposed in the third opening, is coupled with the second part of the third elastic member, and engages with the first part of the third elastic member,
in each of the first elastic member, the second elastic member, and the third elastic member, a penetration hole is formed to extend along a direction of extension of the third part, and
in each of the first elastic member, the second elastic member, and the third elastic member, a cylindrical control member is provided at an inner surface of the penetration hole, the cylindrical control member of each of the first elastic member, the second elastic member, and the third elastic member being formed of a member structurally independent from each of the first elastic member, the second elastic member, and the third elastic member and having a higher rigidity than each of the first elastic member, the second elastic member, and the third elastic member.

2. The inertial measurement unit according to claim 1, wherein the inertial sensor has a 3-axis acceleration sensor.

3. The inertial measurement unit according to claim 1, wherein the inertial sensor has a 3-axis angular velocity sensor.

4. The inertial measurement unit according to claim 1, wherein
each of the first fixing member, the second fixing member, and the third fixing member includes a head part and a washer,
the washer is arranged between the head part and the first elastic member, the second elastic member, and the third elastic member, respectively, and
the cylindrical control portion, at the inner surface of the penetration hole, extends from the washer to the second fixing part.

* * * * *